E. BOUSCAY, Jr.
COMPENSATING JOURNAL FOR MACHINERY.

No. 175,414. Patented March 28, 1876.

Witnesses:
N. S. C. Perkins
F. R. Paulding

Inventor:
Eloi Bouscay Jr.

UNITED STATES PATENT OFFICE.

ELOI BOUSCAY, JR., OF NORWALK, OHIO.

IMPROVEMENT IN COMPENSATING-JOURNALS FOR MACHINERY.

Specification forming part of Letters Patent No. 175,414, dated March 28, 1876; application filed March 22, 1875.

*To all whom it may concern:*

Be it known that I, ELOI BOUSCAY, Jr., of Norwalk, in the county of Huron and State of Ohio, have invented certain new and useful Improvements in Journals for Machinery; and I do hereby declare the following to be a full, clear, and exact description of the invention, such as will enable others skilled in the art to which it pertains to make and use it, reference being had to the accompanying drawings, which form part of this specification.

My invention relates to journals on which wheels or levers revolve or vibrate; and consists, first, in a slotted sleeve, provided with a set-screw passing through same, and bearing upon the rod or shaft, whereby compensation can be afforded for all wear; and, second, in the combination of two such compensating-sleeves, with a space left vacant between them for a supply of oil.

Figure 1:
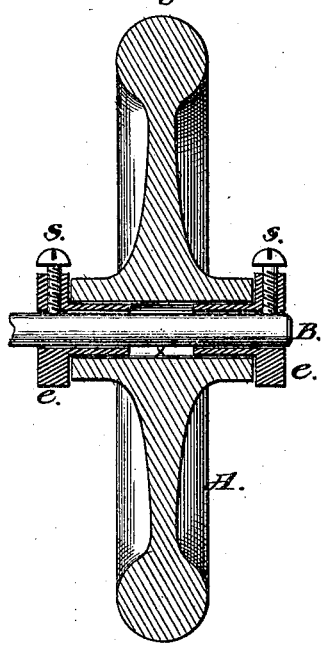
Figure 2:
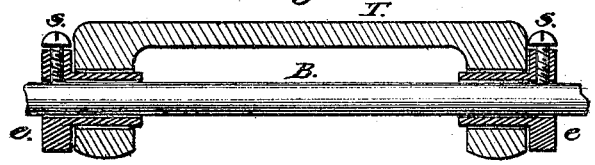
Figure 3:
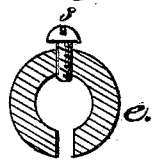

In the drawings, Figure 1 is a cross-sectional view of a wheel on my improved compensation-journal. Fig. 2 is a similar view of a treadle mounted on same, while Fig. 3 is a sectional end view of the slotted sleeve and set-screw.

A is any wheel supported by the shaft B, provided with the slotted sleeves e e, through which latter pass, respectively, the set-screws S S. T is a treadle.

In various classes of machinery and tools it is necessary to use short journals, and sometimes it is desirable to make some of the parts of wood — for instance, in jewelers', model-makers', and amateurs' lathes, dental engines and lathes, glass-engravers', knitting and sewing machines, &c., wherein the drive-wheels are generally mounted on short fixed journals and wooden bearings. Such journals and bearings soon wear loose, and cause a defective operation of the driving mechanism, and a thumping and wabbling action, which is both disagreeable and destructive.

To obviate such objections is the purpose of this invention; and I accomplish such a result by making the rod or shaft B, which is to support the wheel or lever, considerably smaller than the hole in the wheel or treadle, and providing said shaft with a sleeve, e, the internal diameter of which is large enough to slide over the shaft loosely, while its exterior diameter is sufficiently small to leave a very appreciable space between it and the periphery of the hole wherein it is to be used when introduced in its journal state. This sleeve e is slotted longitudinally through its shell, and has a set-screw, S, passing through it, and adapted to bear on the rod or shaft at that end which projects beyond the wheel or lever hub.

My improved journal is operated by placing this sleeve e on a shaft, B, and turning the screw S until it comes in contact with the shaft, and secures the sleeve tightly in place.

It is apparent that by turning the screw to the right it will cause the sleeve to expand and fill out the hole in which it is inserted, while if turned in the opposite direction, it will contract and close together, eventually resuming its normal size, and allowing of the space originally intervening between itself and the wheel. Thus, as the journals become loose and worn it is only necessary to correspondingly adjust the screw, whereupon the sleeve again fills the hole, and a perfect fit is maintained.

I propose to employ either one or more of the slotted sleeve-bearings, and when more than one is used I may or may not leave the space X for retaining a supply of oil.

Having thus fully described my invention, what I claim as new, and desire to secure by Letters Patent, is—

1. The compensating-journal consisting of the slotted sleeve-bearing e, provided with the set-screw S, passing through the same, and bearing upon the shaft or rod B, whereby the sleeve is expanded to compensate for wear, substantially as and for the purpose described.

2. The combination of the two slotted sleeves e e, provided with their set-screws S S, passing through the said sleeves and bearing upon the rod or shaft B, and the space X left between the two sleeves for retaining a supply of oil, substantially as and for the purposes described.

ELOI BOUSCAY, JR.

Witnesses:
N. S. C. PERKINS,
F. R. PANTLIND.